V. J. ODHNER.
CALCULATING MACHINE.
APPLICATION FILED APR. 26, 1919.
1,348,576.
Patented Aug. 3, 1920.
2 SHEETS—SHEET 1.
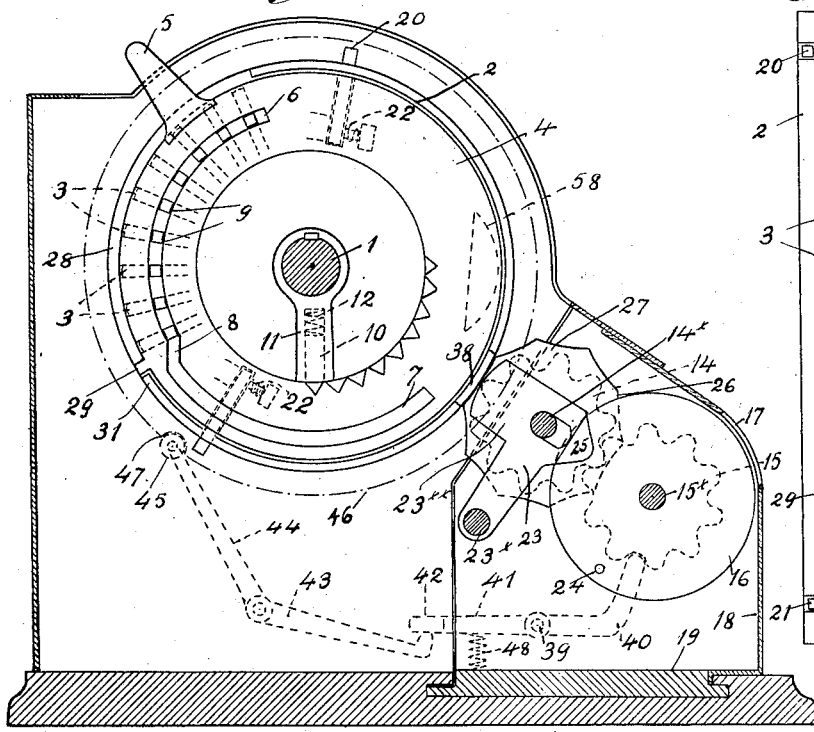
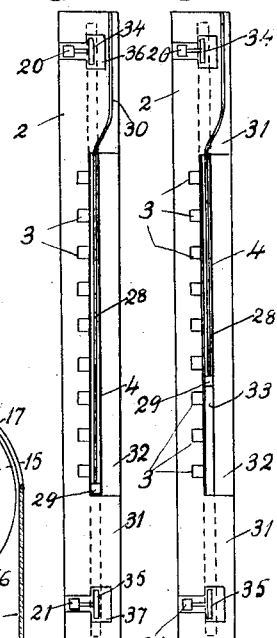
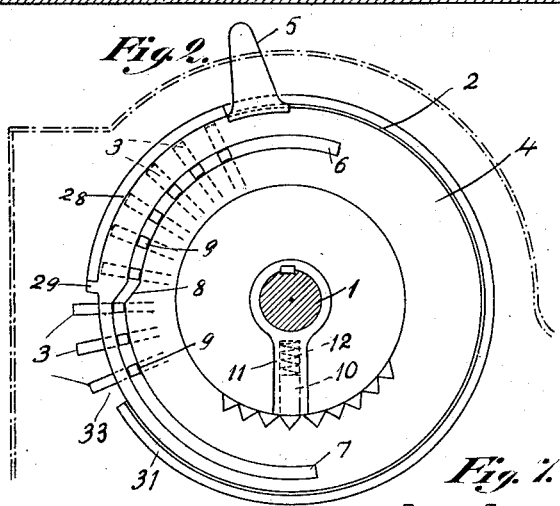
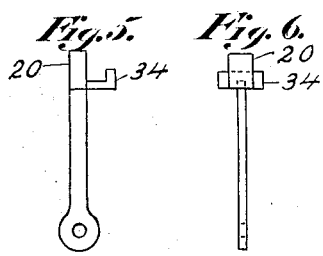
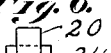
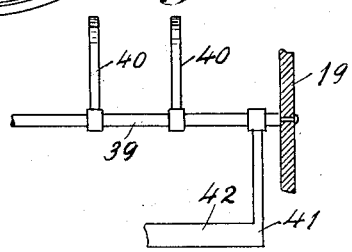
Inventor,
V. J. Odhner
By H. R. Kerslake
Atty.

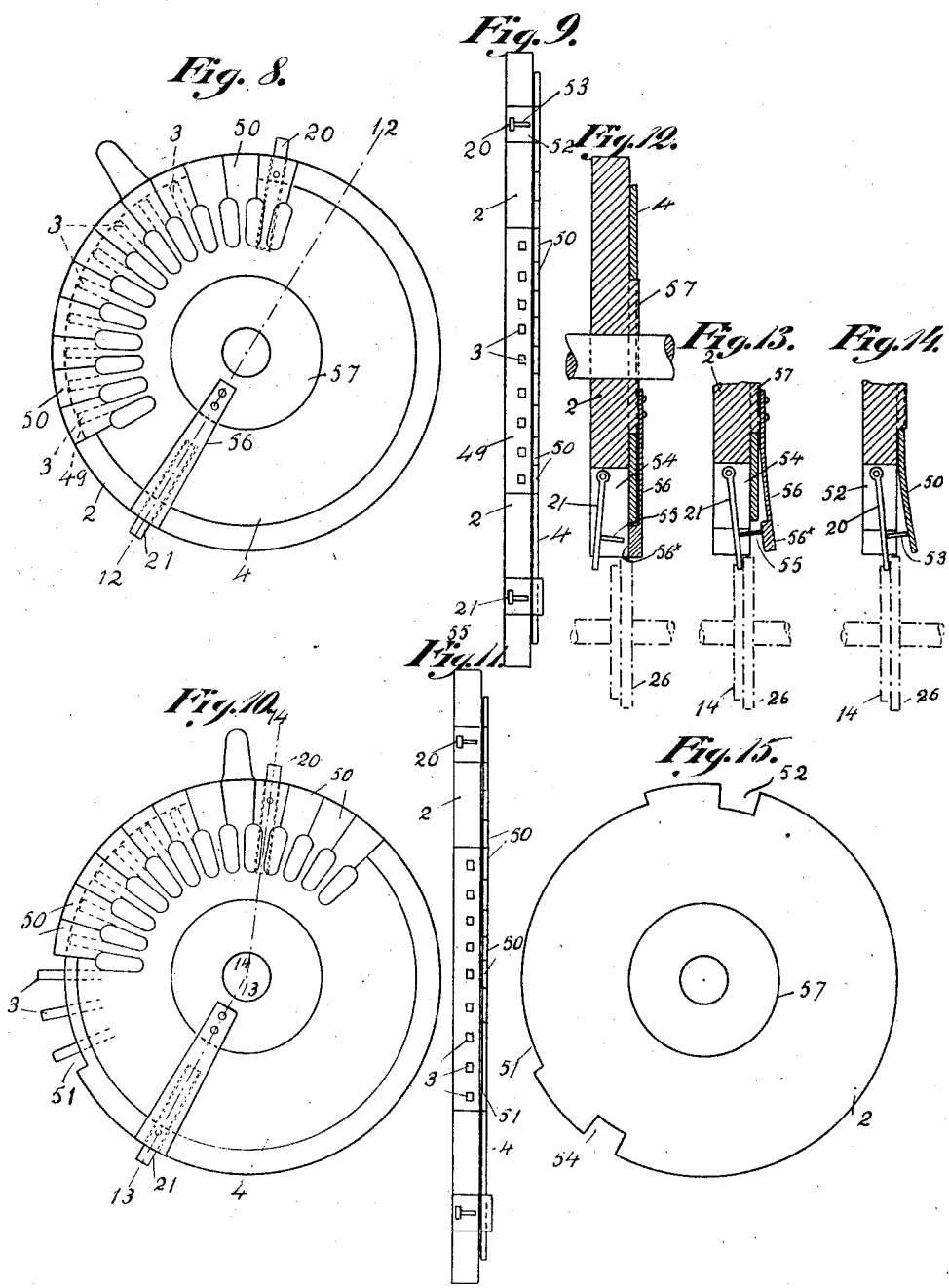

UNITED STATES PATENT OFFICE.

VALENTIN JAKOB ODHNER, OF STOCKHOLM, SWEDEN.

CALCULATING-MACHINE.

1,348,576.     Specification of Letters Patent.     Patented Aug. 3, 1920.

Application filed April 26, 1919. Serial No. 292,981.

*To all whom it may concern:*

Be it known that I, VALENTIN JAKOB ODHNER, a subject of the King of Sweden, and resident of Karlaplan 2, Stockholm, in the Kingdom of Sweden, have invented certain new and useful Improvements in Calculating-Machines, of which the following is a specification, reference being had therein to the accompanying drawings.

This invention relates to improvements in calculating machines of that class, which have a number of calculating wheels provided with radially movable pins, which are brought into operative position by means of curve disks rotatably mounted on the calculating wheels respectively and, as the calculating wheels are rotated, engage toothed wheels or the like for the shifting of the indicating disks of the machine. The invention relates especially to machines of the said construction, in which the calculating wheels are provided with laterally swingable pins, which are deflected to run on the line of rotation of the pins first mentioned, in order to engage the said toothed wheels and carry the "tens," "hundreds," etc., to the next column of value. In order to prevent the indicating disks of the machine, when shifted, from rotating through a too great angle acted upon by the momentum imparted to the said disks and parts belonging to the same, when the calculating wheels are rotated very rapidly, it has been proposed to lock the indicating disks by means of star-wheels, which bear preferably against the periphery of the calculating wheels respectively but for which a recess is provided in the said periphery at the shifting of the pins, the length of which corresponds to the number of pins brought into operative position, so that the star wheels and the indicating disks may be rotated freely, when shifted by the said pins, but are then again locked. As machines provided with the said locking mechanism hitherto have been constructed the recesses provided in the circumferential surface of the calculating wheels and necessary for the transmitting of the "tens," etc., always have been uncovered, owing to which fact the indicating disks are not locked, while the said recesses pass by the star-wheels but there would be a possibility of an accidental rotating of the indicating disks, if the latter are not provided with any other locking means. For the removal of the said disadvantage the calculating disks according to this invention are provided for each "ten" pin etc. with a movable part, which normally covers the said recess and locks the star-wheel but, as the "ten" pin etc. is moved into its active position, is brought away, so that the star-wheel and the indicating disk may be rotated by the "ten" pin. In order that it may be possible to reset the indicating disks to zero without any obstacle effected by the star-wheels a recess is provided in the circumferential surface of the calculating wheels respectively, according to this invention, which is located at the star-wheels respectively, when the calculating wheels have been turned to zero. In the said position the indicating disks must be locked by latches, which, however, are disengaged immediately at the starting of the calculating wheels, at which moment the star-wheels take over the locking of the indicating disks.

In the accompanying drawings Figure 1 is an end view of a calculating machine arranged in accordance with this invention. Only such parts of the machine are shown as are necessary for the explaining of the invention. Fig. 2 is a side view of a calculating wheel and the curve disk, rotatably mounted on the same for the shifting of the pins; the said disk being shown in a position different from that shown in Fig. 1. Figs. 3 and 4 are edge views of a portion of the calculating wheel evolved. Fig. 3 shows the parts in the same position as in Fig. 1, and Fig. 4 corresponds to Fig. 2. Figs. 5 and 6 show a "ten" pin ("hundred" pin, etc.) viewed from two different sides. Fig. 7 shows a latch common to all indicating disks. Fig. 8 is a side view of a calculating wheel, arranged in accordance with a further form of the invention. Fig. 9 is an edge view of a portion of the said wheel evolved. Figs. 10 and 11 correspond to Figs. 8 and 9 but show the parts in other positions. Fig. 12 is a section on the line 12 to 12 of Fig. 8, on a greater scale. Figs. 13 and 14 are sections on a greater scale and on the lines 13 to 13 and 14 to 14 respectively of Fig. 10 and show for instance two "ten" pins brought into operative position. Fig. 15 is a side view of the calculating wheel shown in Fig. 8, parts belonging to the said wheel being omitted.

On a shaft 1, Figs. 1 to 4 inclusive, journaled in the frame of the machine, are fixed, as usually, calculating wheels 2, located at the side of one another. Only one of the said wheels is shown in the drawings. Radial pins or rods 3 are, as usual, slidably mounted in the wheel and may be brought into a projecting position by means of a ring-shaped, rotatable disk 4, which is located at the side of the calculating wheel and is shifted by means of a finger piece 5. The said ring 4 has two concentric slots 6, 7 opening into each other by a curved or inclined step 8, in which slots lugs 9 on the pins 3 engage. The ring 4 is locked in adjusted position by a catch 10, which is provided in a sleeve 11, fixed to the shaft 1, and is held by a spring 12 in engagement with notches 13 in the ring 4. In Fig. 1 all pins 3 are shown in their retracted position. According to Fig. 2 the ring 4 has been rotated into a position, in which it has brought three pins 3 into projecting position. As the calculating wheel is rotated, which is effected by rotating the shaft 1 by means of a crank not shown, the said three projecting pins engage the teeth of an intermediate wheel 14 and turn the same a distance of three teeth, the said intermediate wheel turning the registering wheel 15, so that an indicating disk 16, connected with the said registering wheel 15 and provided with figures from 0 to 9 inclusive on its circumferential surface is turned a distance of three figures. The figures are rendered visible in proper turn through an opening 17 provided in the casing 18 of a carriage 19, carrying the indicating disks and the said gear wheels 14, 15. The said intermediate wheels and registering wheels together with the indicating disks are rotatably mounted on shafts 14$^x$ and 15$^x$ respectively in the carriage 19. To the calculating wheels 2 (except the calculating wheel of the units) "ten" pins 20, 21, "hundred" pins etc. are pivoted, which are swingable transversely of the wheels and are normally held by a spring 22 to one side so as not to be in the same plane of rotation with the pins 3 but for the carrying of the "ten", the "hundred" etc. to the next column of value are deflected and located in the said plane, so that the pins, while the calculating wheels are rotated, engage the intermediate wheels 14 and turn the same the distance of one tooth. For effecting the said deflection the machine is provided with an arm 23 fulcrumed on a rod 23$^x$ in the carriage 19 and formed with a head 23$^{xx}$. The said head 23$^{xx}$ is brought into the plane of rotation of the "ten" pin by a pin 24, which is provided on the indicating disk belonging to the calculating wheel for the units and acts upon a cam surface 25 on the head 23$^{xx}$, so that a cam surface on the head 23$^{xx}$ deflects the pin 20. The parts now described are found in calculating machines hitherto used and are described more closely in the U. S. Letters Patent No. 514,725.

A star-wheel 26 is fixed to or made integral with the intermediate wheels 14 respectively and is provided with as many recesses and consequently as many teeth as there are teeth on the intermediate wheel 14, so that there is one recess for each tooth, which recess is located opposite to the tooth, as shown in Fig. 1. The said recesses are formed with the same radius as the calculating wheels 2 and the position of the star wheel is so adapted, that the star-wheel bears against the circumferential surface of the calculating wheel. As the calculating wheel is in its normal position, shown in Fig. 1, a recess 38, provided in the circumferential surface of the calculating wheel for the purpose stated below, is opposite to the star-wheel 26. As soon as, however, the calculating wheel is rotated from the position shown in Fig. 1, the star-wheel 26 and, consequently, also the intermediate wheel 14, the registering wheel 15 and the indicating disk 16 are locked by the calculating wheel. In order to render free the star-wheel etc. while the projecting pins of the calculating wheels pass the intermediate wheel, the calculating wheel is provided with means, effecting an opening in the circumferential surface of the calculating wheel, through which the teeth of the star-wheel can pass.

According to Figs. 1 to 4 inclusive the machine is arranged in the following manner for the accomplishing of the said purpose: The ring 4 is located in a lateral recess provided in the calculating wheel 2, so that there is a flange 31 extending substantially around the ring 4 and covering the same. The said star-wheel 26 bears against the said flange. The recess 38 mentioned above is provided in the said flange. Besides, a recess 32 is provided in the flange 31, extending along the set of nine pins 3 carried by the calculating wheel. A flexible, curve shaped band 28 is fixed at its one end to a lug 29 on the ring 4, while its other end is located in a slot 30 in the circumferential surface of the calculating wheel, which slot has a special shape for the purpose stated below. The inner edge of the band bears against the circumferential surface of the ring 4. When the ring 4 together with band 28 is in the position, shown in Figs. 1 and 3, the band 28 extends along the whole recess 32, from one end of the same to its other end and for some distance into the slot 30. The said band has such a position, that as the calculating wheel is rotated and the recess 32 passes the star-wheel, the band 28 will engage the star-wheel and lock the same. The width of the star-wheel is substantially equal to the width of the band.

As the ring 4 is rotated for throwing out the desired number of pins 3, the band 28 is moved, so that an opening is provided between the end of the flange 31 and the lug 29, which opening is located at the side of the projecting pins and the length of which corresponds to the number of projecting pins. In Figs. 2 and 4 three pins in the projecting position and a corresponding opening 33 are shown, the said opening being located between one end of the flange 31 and the lug 29. As the calculating wheel is rotated, in one or the other direction, and the foremost one of the projecting pins engages the intermediate wheel 14, the opening 33 is at the star-wheel, so that the latter is released and three teeth of the same can pass through the opening, while the intermediate wheel 14 is rotated by the calculating wheel a distance of three pins. The star-wheel is then stopped again by the flange 31 or by the band 28, dependent on the direction, in which the calculating wheel is rotated. As seen from the drawings, the opening 33 is always located at the projecting pins and the length of the same corresponds always to the number of the projecting pins. Consequently, if for instance eight pins are thrown out, the opening extends along the set of the said eight pins and permits eight teeth of the star-wheel to pass, before it is stopped again.

As the "ten" pin 20 and 21 respectively, deflected into its operative position in the manner described above, passes the star-wheel, an opening must be provided in the flange 31, through which the star-wheel can pass. For that reason the "ten" pins (as well as the "hundred" pins etc.) are arranged as shown in Figs. 3 to 6 inclusive. An angular projection 34, 35 respectively projects from the pin into a recess 36, 37 respectively in the flange 31 and the top edge of the said projection is flush with the side of the flange. While the pins 20, 21 are in their normal position, Figs. 3 and 4, the projections 34, 35 constitute a continuation of the part of the flange 31 engaging the star-wheel. As, however, the "ten" pin is deflected by the head $23^{xx}$ to run in the plane of rotation of the pins 3, the projection 34 or 35 respectively is also deflected, so that the star-wheel can pass through the opening 36 or 37 respectively, as the intermediate wheel is rotated by the "ten" pin. The length of the openings 36, 37 is so adapted, that only one tooth of the star-wheel can pass through the same and the star-wheel subsequent to the rotation, is locked again by the calculating wheel. The length of the projections 34, 35 is substantially equal to the length of the openings. For making room for the opening 36 in the flange 31, the slot 30 for the band 28 is shaped as shown in Figs. 3 and 4.

After the calculation has been effected, all indicating disks must be reset to zero, as usual, which is effected by rotating the shaft $15^x$, which then is shifted longitudinally, in known manner, and by means of pins engages the indicating disks. While the indicating disks are turned to zero, the intermediate wheels together with the star-wheels must be able to rotate without being prevented by the calculating wheels. For that reason the opening 38, Fig. 1, is provided in the flange 31 of the calculating wheels respectively, which, when the calculating wheel is in zero, is at the star-wheel. As soon as, however, the calculating wheel is rotated for effecting the calculating operation, the opening 38 is moved from the star-wheel and the latter is then locked by the calculating wheel in the manner described above. 58 is the ordinary cam piece provided on the calculating wheel for returning the arm 23 with the head $23^{xx}$ into its inactive position. The said arm is held in its operative and inoperative positions respectively by a catching device, not shown.

39 is a rod rotatably mounted in the carriage 19, from which arms 40 extend, which engage the registering wheels 15 respectively and lock the same and the indicating disks 16. From the said rod 39 arms 41 extend, which carry a bar 42, which is engaged by one 43 of the arms of a two-armed lever 43, 44, pivoted to the frame of the machine. The other arm 44 of the said lever is provided with a roller 45, which bears against a disk 46, rotating with the calculating wheels and provided with a notch 47. While the calculating wheel is in zero position, the roller 45 engages the said notch 47 and the arms or catches 40 engage the registering wheels acted upon by a spring 48. Consequently, as the opening 38 is at the star-wheel, the latter is locked only by the catch 40 engaging the registering wheel 15. Immediately at the starting of the calculating wheels the lever 43, 44 is swung by the cam-disk 46 and forces all catches 40 out of engagement with the registering wheels 15. Consequently, during the effecting of the calculating operation all catches are disengaged and thus effect no resistance against the rotation of the wheels. Owing to the said fact the calculating machine runs very easily and the catches effect no noise. The said catches lock the registering wheels and the indicating disks only while the calculating wheels are in zero position. As soon as the calculating wheels are rotated from the said position, the calculating wheels themselves take over the locking function.

In the form of the invention shown in Figs. 8 to 15 inclusive one portion of the star-wheel 26, transversely of the same, bears against the circumferential surface or edge of the calculating wheel 2, while the other portion of the star-wheel can bear against the ring 4, adapted to shift the pins 3. In the edge of the calculating wheel 2 a recess 49 is provided, which extends along the whole set of pins 3. As the said recess 49 passes the star-wheel during the rotation of the calculating wheel the star-wheel engages only the ring 4, which ring for a part of its circumference has the same radius as the calculating wheel. The said part is divided into radial tongues 50 for the purpose stated below. In Figs. 8 and 9 the said ring 4 is shown in its starting position. In the said position the set of tongues extends along the whole recess 49 and to the "ten" pin 20. As the ring is shifted for throwing out for instance three pins 3, as shown in Figs. 10 and 11, an opening or gap 51 is effected at the said three pins, at which the star-wheel is engaged neither by the calculating wheel nor by the tongues of the ring 4. Consequently, while the said three pins rotate the intermediate wheel and the registering wheel together with the indicating disk, three teeth of the star-wheel can pass through the gap 51, the star-wheel being then locked again by the tongues of the ring 4 or by the calculating wheel, dependent on the direction, in which the calculating wheel is rotated. Also in the present form of the invention openings must be procured, through which one of the teeth of the star-wheel can pass, as the "ten" pins etc. are brought into operative position. This is effected by the "ten" pin 20, which is located in a recess 52 in the circumferential surface of the calculating wheel, having a pin 53, which, as the pin 20 is brought into its operative position, deflects one of the tongues 50 of the ring 4, located opposite to the "ten" pin, as shown in Fig. 14, so that the said tongue ceases to form an abutment for the star-wheel. One of the teeth of the latter may then pass through the gap, while the pin 20 rotates the intermediate wheel and the star-wheel. The latter is then locked by the calculating wheel and also by the tongues of the ring 4. Also the second "ten" pin 21 of the calculating wheel is movable in an opening or recess 54 in the calculating wheel and is provided with a pin 55, which, as the pin 21 is brought into its operative position, deflects a tongue 55, fixed to the hub of the calculating wheel 2. The said tongue 56 has a lateral projection 56ˣ, which, as the tongue 56 is in its normal position, is located in the same plane as the tongues 50 of the ring 4 and consequently locks the star-wheel, as the "ten" pin 21 passes the same, see Fig. 12. If, on the other hand, the pin 21 is in its operative position, it keeps the tongue 56 in the position shown in Fig. 13, so that the star-wheel may be rotated a distance of one pin.

As seen from the above description, the registering wheel together with the indicating disk is, in both forms of the invention, perfectly locked by the star-wheel and the calculating wheel, until the projecting pin or pins of the latter effect the shifting of the indicating disks. Immediately after the said shifting the indicating disk is locked again by the star-wheel. Even if the calculating wheel is rotated very rapidly, the intermediate wheel, the registering wheel and the indicating disk are locked by the star-wheel in the most reliable manner and may not be moved beyond the new position by the momentum imparted to the same. Owing to the said fact and the fact that the star-wheel normally is locked, while the "ten" pins, etc., pass the same, the machine operates in the most reliable manner.

Having now described my invention, what I claim as new and desire to secure by Letters Patent is:

1. In a calculating machine the combination with calculating wheels, pins provided on the said calculating wheels, means for shifting the said pins, wheels engaged by said pins and brought into operative position and rotated by the pins during the rotation of the calculating wheels, indicating disks rotated by the said engaged wheels, deflectable "ten" pins, "hundred" pins, etc., on the said calculating wheels, star-wheels coöperating with the calculating wheels respectively and locking the indicating disks, except at such unit pins as have been brought in operative position, of a movable piece at the "ten" pin, etc., which piece normally locks the said star-wheel, while the "ten" pin, etc., passes the same, and means for moving the said piece out of locking position, as the "ten" pin is deflected into operative position.

2. In a calculating machine the combination with calculating wheels, pins provided on the said calculating wheels, rotatable curve disks for shifting the said pins, wheels engaged by said pins and brought into operative position and rotated by the pins during the rotation of the calculating wheels, indicating disks rotated by the said engaged wheels, deflectable "ten" pins, "hundred" pins, etc., on the said calculating wheels, star-wheels coöperating with the calculating wheels respectively and locking the indicating disks, except at such unit pins as have been brought in operative position, of tongues provided on the said curve disks and locking the said star-wheels, one of the said tongues being always located at the "ten" pin position, etc., of the calculating wheels, a tongue provided on the calculating wheels at the other "ten" pin position, etc., of the said wheels and locking the star-wheel, and a device, by means of which the "ten" pins, etc., when deflected deflect the said tongues out of locking position.

3. In a calculating machine the combination with calculating wheels, pins provided on the said calculating wheels, means for shifting the said pins, wheels engaged by said pins and brought into operative position and rotated by the pins during the rotation of the calculating wheels, indicating disks rotated by the said engaged wheels, deflectable "ten" pins, "hundred" pins, etc., on the said calculating wheels, starwheels coöperating with the calculating wheels respectively and locking the indicating disks, except at such unit pins as have been brought in operative position, of a movable piece at the "ten" pin position, etc., which piece normally locks the said starwheel, while the "ten" pin, etc., passes the same, means for moving the said piece out of operative position, as the "ten" pin is deflected into operative position, a recess provided in the calculating wheels respectively and located at the star-wheel, when the calculating wheel is in zero position, for permitting the rotation of the star-wheel, as the indicating disks are turned to zero position, a catching device locking the calculating wheels when in zero position, and means keeping the said catching device in disengaged position, while the pins operate.

In witness whereof I have hereunto signed my name.

VALENTIN JAKOB ODHNER.